United States Patent Office.

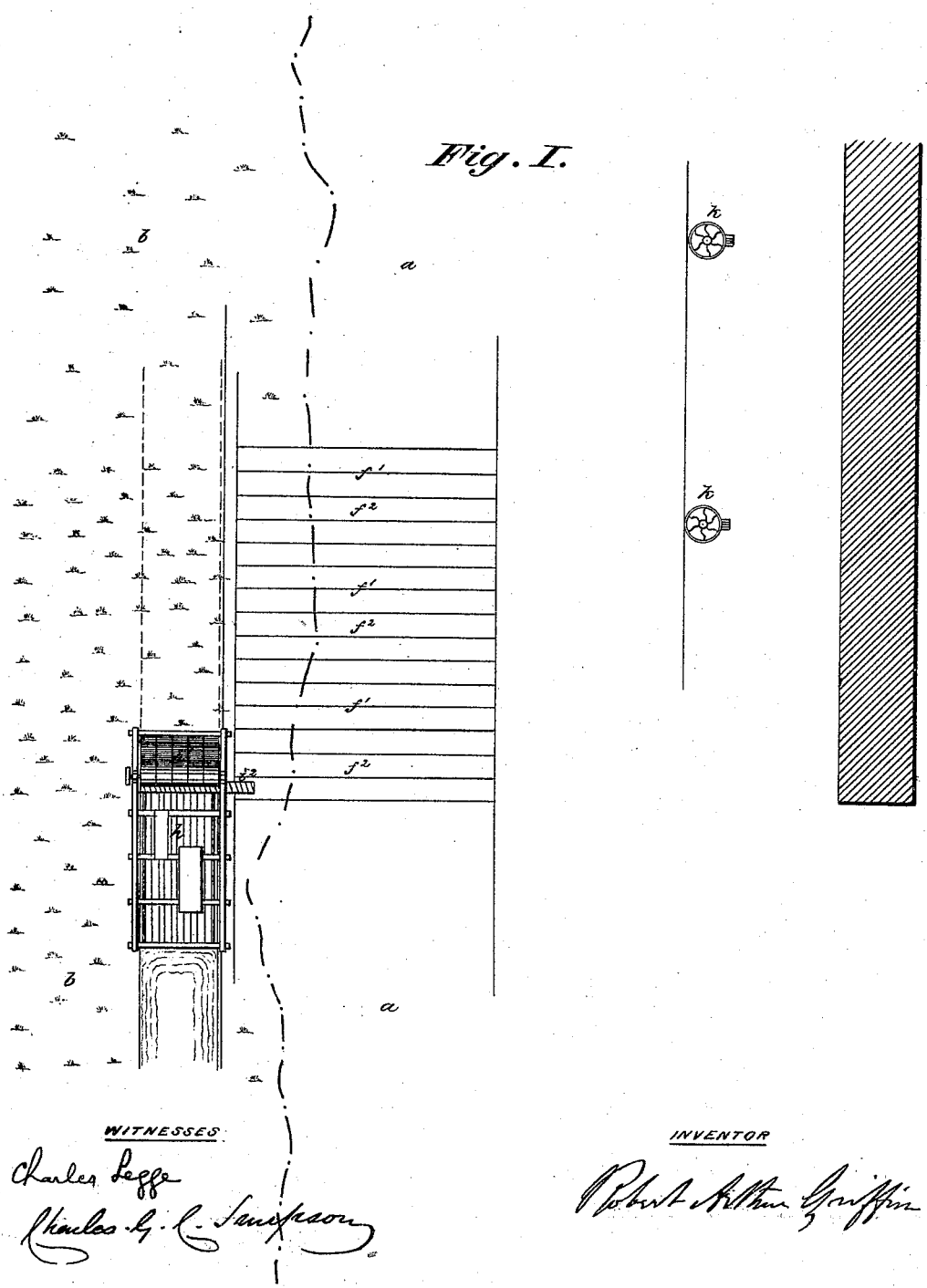

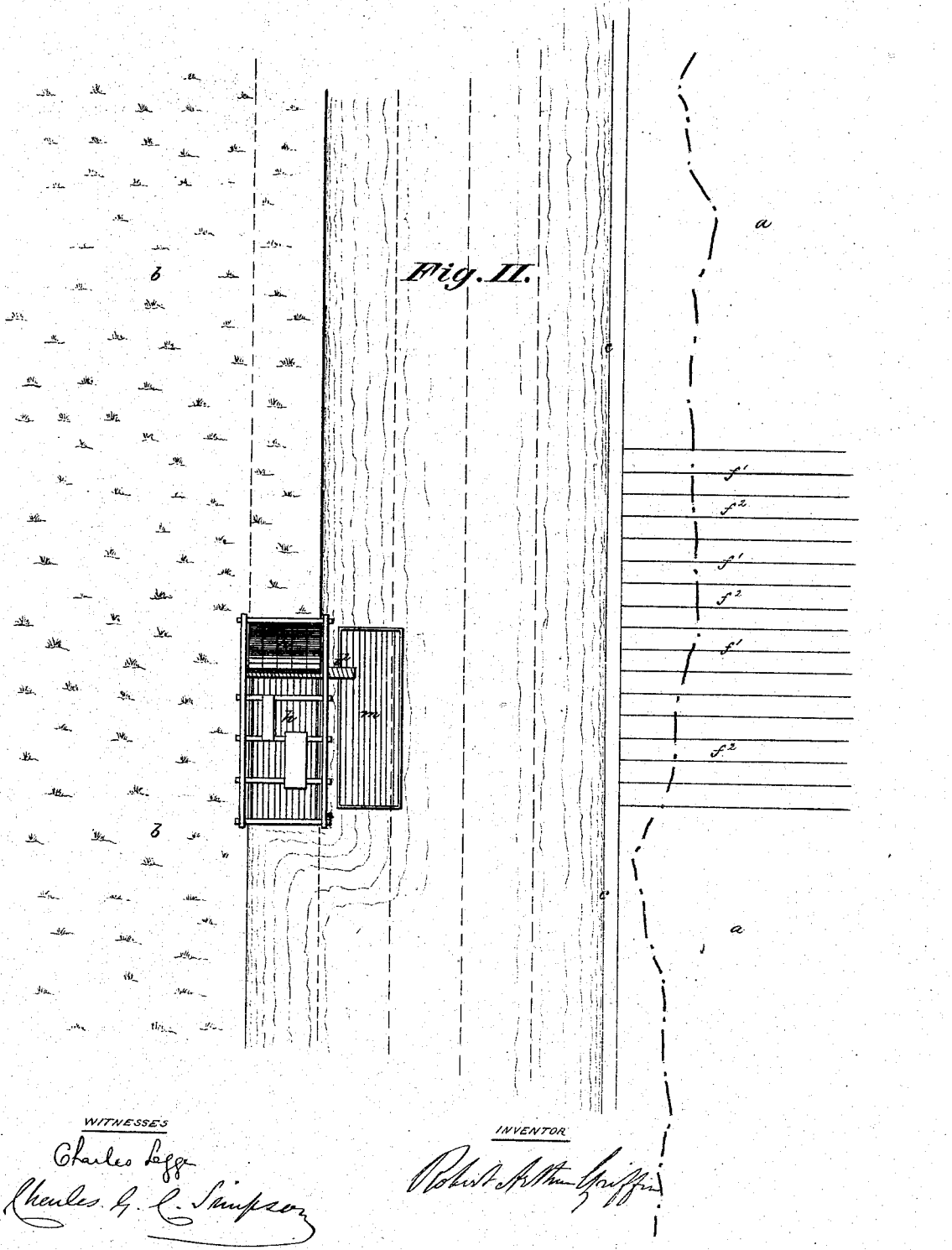

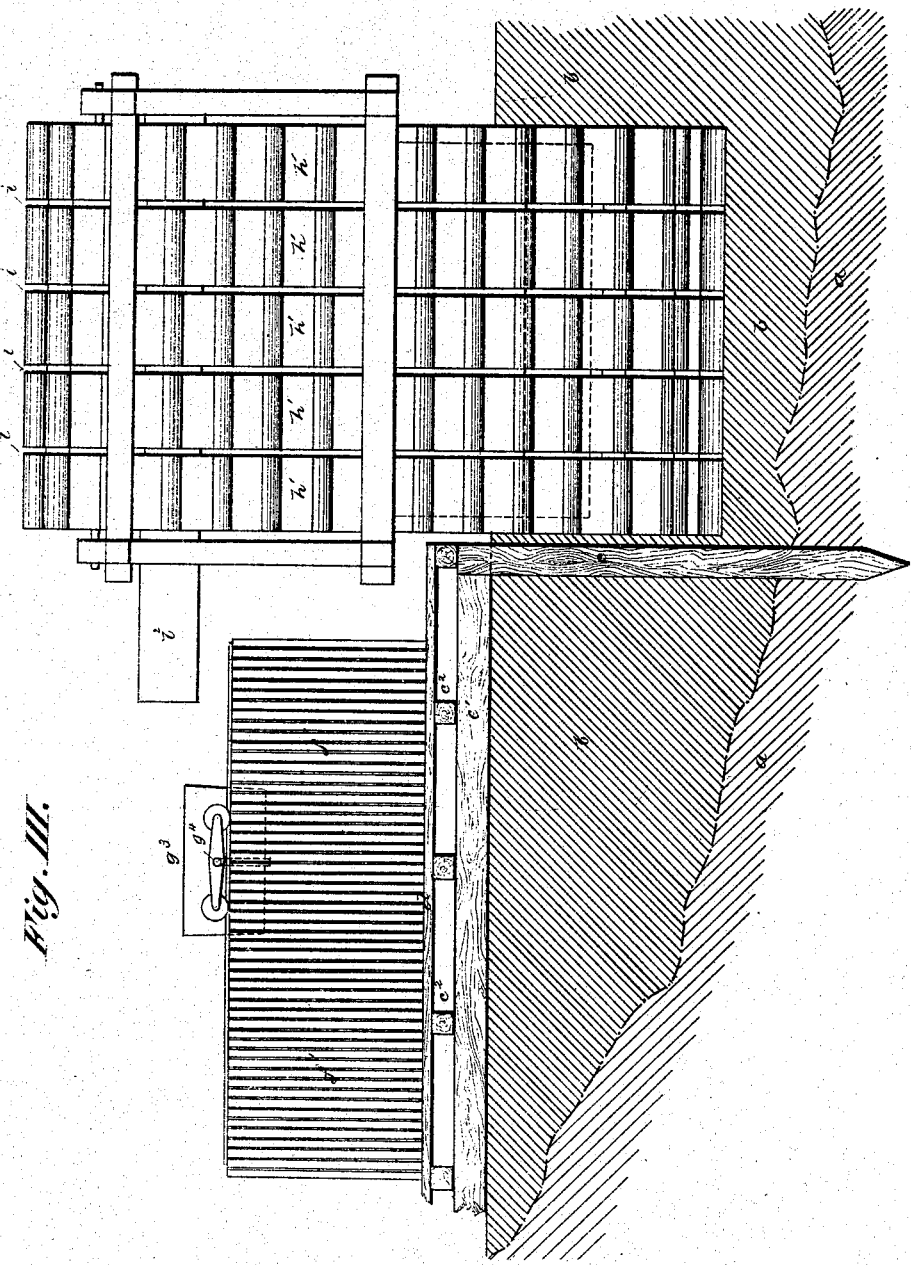

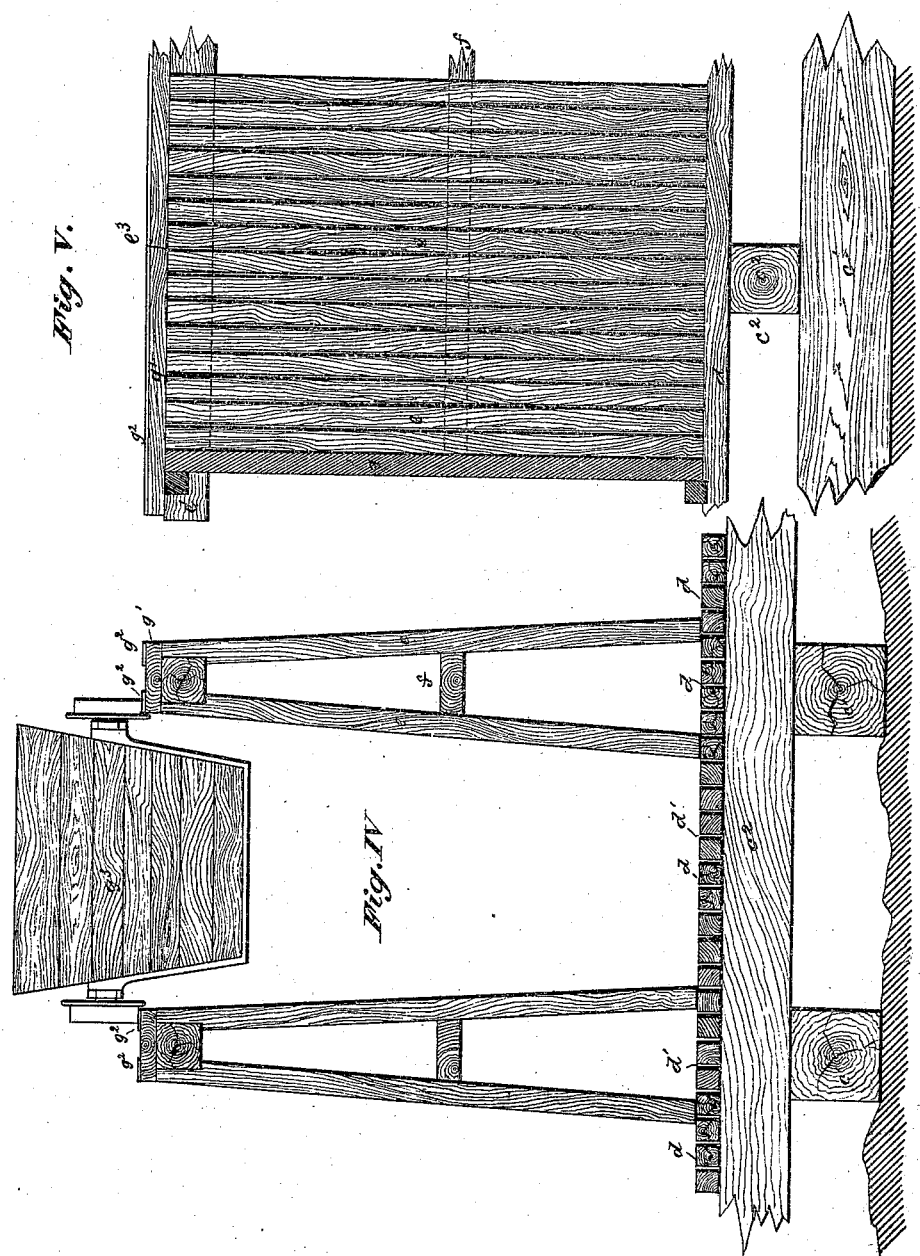

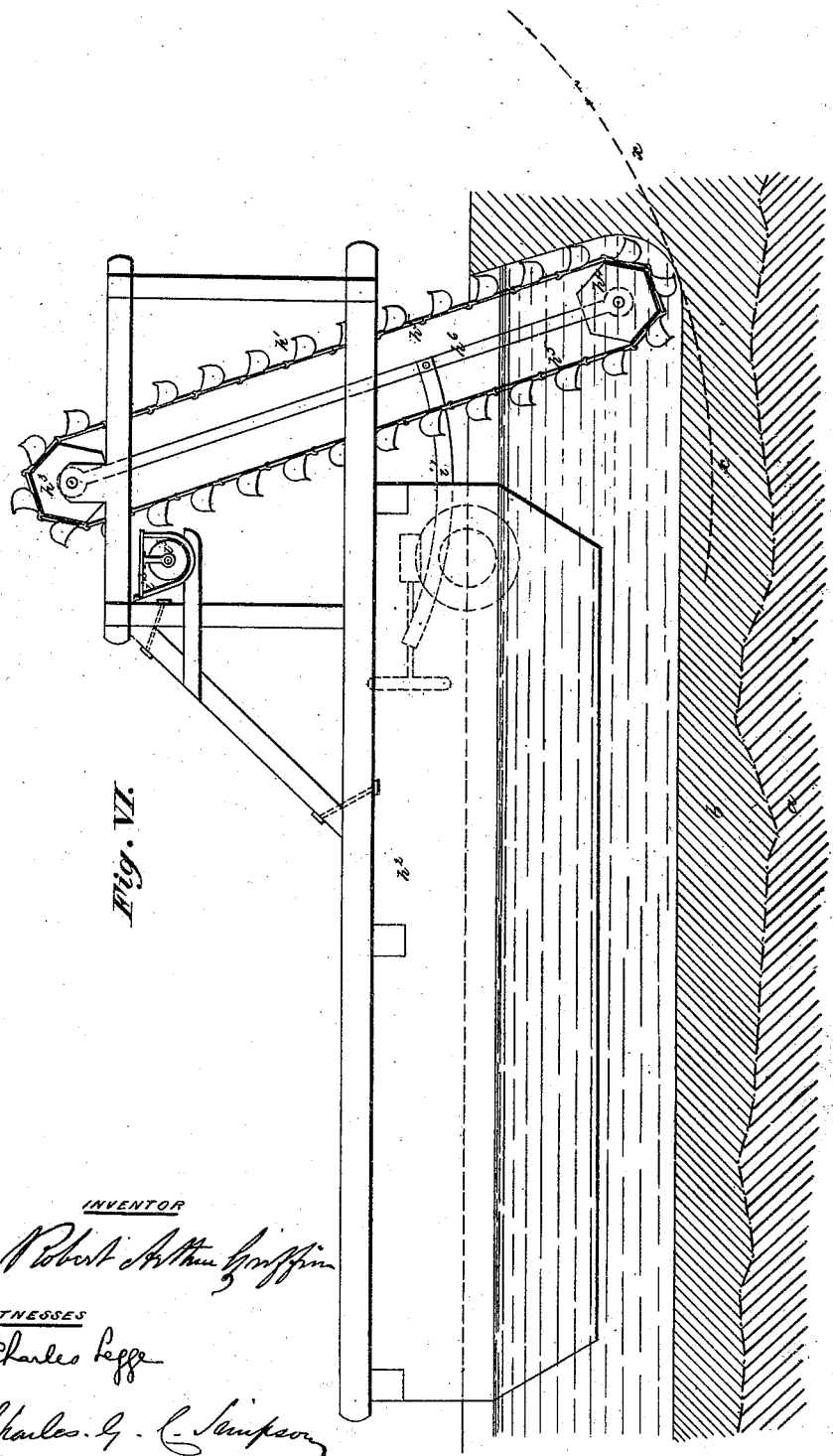

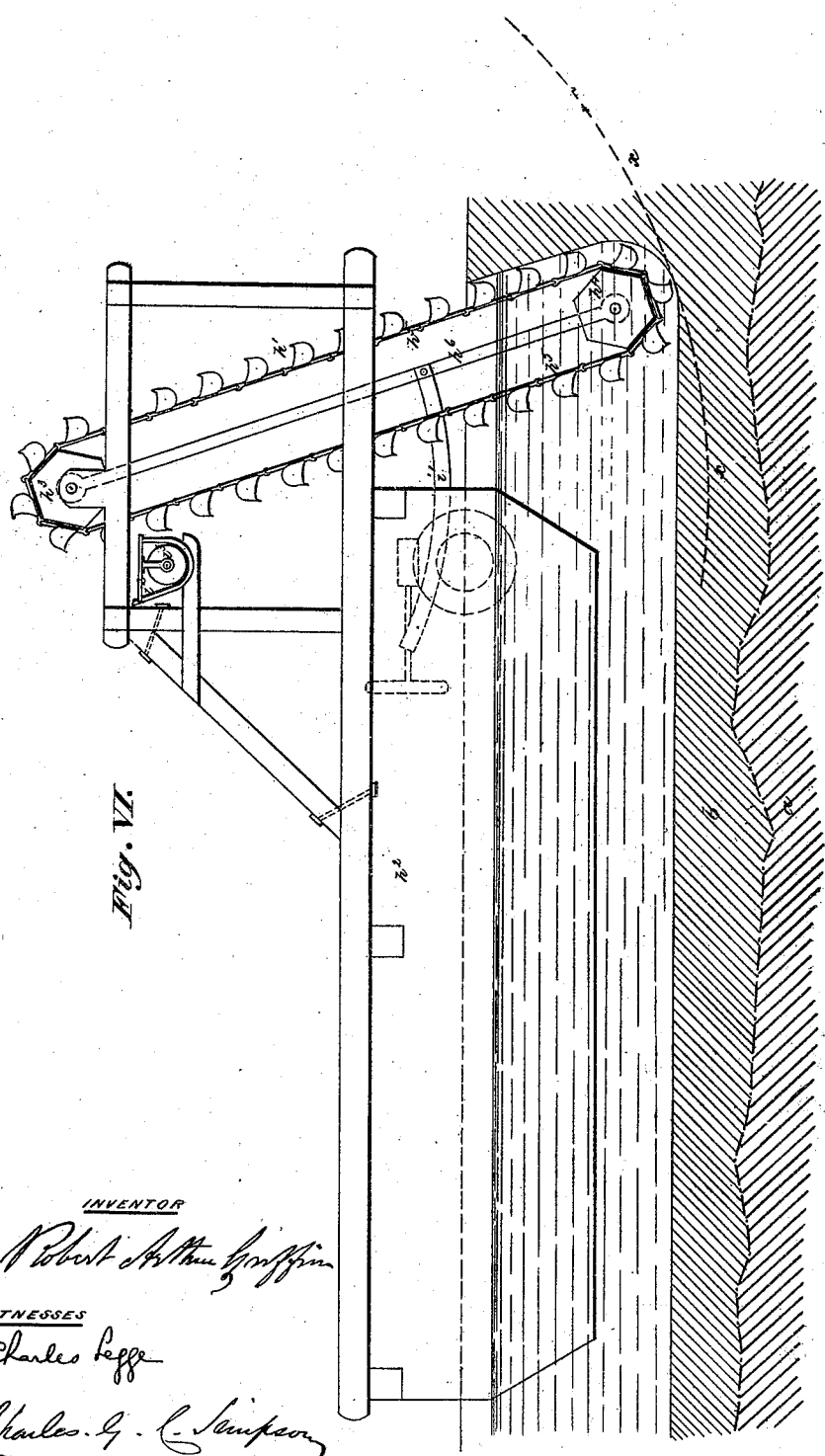

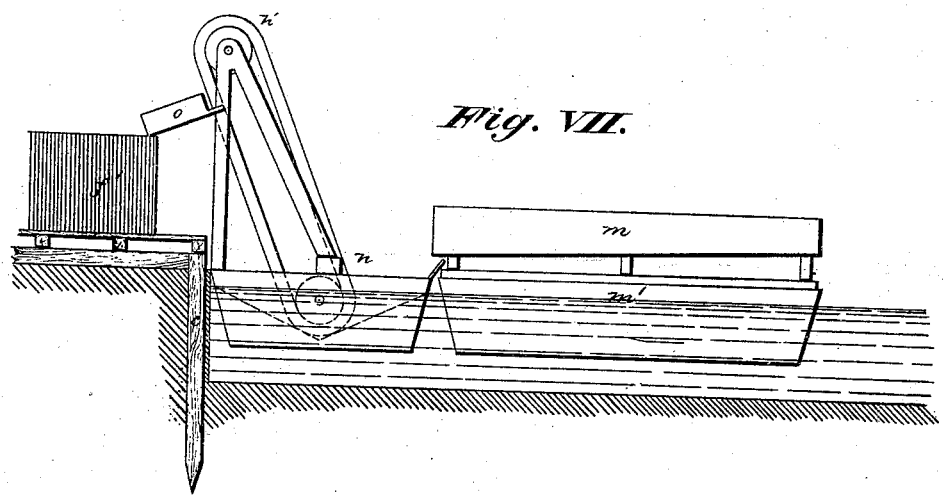
Fig. VII.
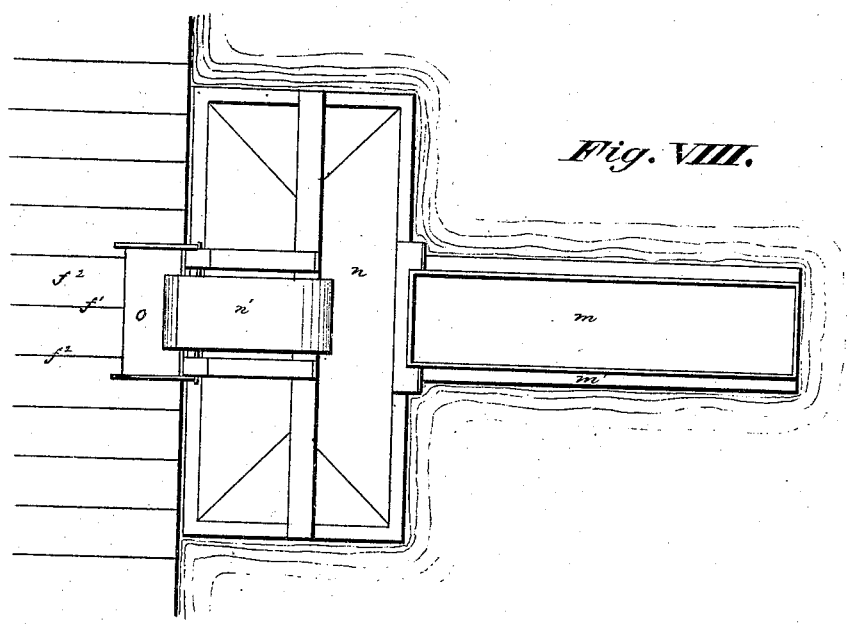
Fig. VIII.

ROBERT ARTHUR GRIFFIN, OF MONTREAL, CANADA.

Letters Patent No. 113,423, dated April 4, 1871.

---

IMPROVEMENT IN THE MANUFACTURE OF PEAT-FUEL.

---

The Schedule referred to in these Letters Patent and making part of the same.

---

*To all whom it may concern:*

Be it known that I, ROBERT ARTHUR GRIFFIN, of the city of Montreal, in the district of Montreal, in the Province of Quebec, gentleman, have invented new and useful "Improvements on the Art of Manufacturing Peat-Fuel and on the Apparatus used therefor;" and I do hereby that the following is a full, clear, and exact description of the construction and operation of the same, reference being had to the annexed drawing, where—

Figure I represents a plan of general arrangement at the commencement of operations at the bog.

Figure II, a plan of general arrangement after the work is advanced.

Figure III, an elevation of curers and their foundation, with excavator in first cut.

Figure IV, a detail of curers.

Figure V, a detail of curers.

Figure VI, a side elevation of excavator.

Figure VII, an elevation of elevator, &c.

Figure VIII, a plan of elevator, &c.

This invention has reference to improvements on the art of manufacturing peat-fuel and on the apparatus used therefor, whereby peat fuel is produced in less time and with less labor, and of superior quality, than by the processes at present in use.

In the drawing hereunto annexed similar letters of reference indicate like parts.

Letter $a$ is the solid earth.

$b$ is the peat-bog; the supposed line of juncture is indicated by the crooked chain line in the drawing.

In the commencement of operations, and having selected a suitable situation, where the depth of the bog is sufficient for the purpose of making the front cut and at the same time nearly approaching the solid earth, a line of piles, $c$, is driven at required distances apart, more or less, as found desirable.

To the top of these piles are attached, by dovetails or otherwise, the ends of timbers $c^1$, extending over the top of the bog and onto the solid earth. These timbers are laid with a slight incline, being lowest at the land-end, and are of considerable length.

On the top of these timbers $c^1$ a second course of timber, $c^2$, laid crosswise with them, each of the timbers $c^2$ being a suitable and equal distance apart, and if required pinned down to the lower timbers with tree-nails, or otherwise secured. This is covered with square scantling $d$, of suitable size, laid in the same direction as the lower timbers, having a suitable space, $d'$, between each scantling.

The extent of the platform thus formed will be commensurate with the scale of operations to be carried on, and forms the bottom of the curing-vessels, constructed as shown in detail in Figs. IV and V, by attaching scantling $e$ to a beam, $e^1$, of suitable dimensions, in such a manner as to give them an incline, as indicated.

These scantlings also have suitable spaces $e^2$, between each, a plank, $f$, or other suitable supports being placed between the two. Each separator, $f^1$, thus constructed, forms the side of two contiguous curing-vessels, $f^2$, shown in Figs. I and II. They are secured on the platform $d$ in any desired manner, running in the direction of the timbers $c^1$, and extending from a little back of the line of piles $c$ to the end of the platform $d$. The front and back ends of the curers $f^1$ are formed of a simple vertical row of scantling, $g$, and similar to the separator, and secured to them in any proper manner.

On the top of the beam $e^1$ and scantling $e$ a wale piece, $g^1$, is placed, extending the whole length of each separator $f$, and at the back end extended, as will be hereinafter described.

On the top of this wale piece, and flush with its edges, two strips of iron are attached, forming rails $g^2$, for the wheels of a dump-wagon, $g^3$, to run upon.

This dump-wagon is of the form shown in the drawing, and made to turn completely over on the pivots $g^4$, a hole having been cut of sufficient depth and size, so that when it is filled with water by drainage from the bog the excavator $h$ will float in it; and longitudinally alongside of the piles $c$ it begins the first cut, and extends it along in front of the piles as close as can be.

The excavator $h$ is constructed somewhat similar to the dredging-machines at present employed, only that instead of being supplied with one row of narrow buckets it is made with any desired number of rows of buckets $h^1$, having together a greater width than that of the vessel $h^2$, on which they are placed, for the purpose of giving it free floating room, the upper roller $h^3$ being driven by a steam-power provided on board the vessel $h^2$; the lower roller $h^4$ is carried and maintained at the required distance to keep the chains $h^5$ taut by hangers $h^6$ provided with any desired means of lengthening them, to compensate for the lengthening of the chains by wear.

These hangers are placed at the openings or spaces $i$, between the rows of buckets, and passing through them on the aft side. A segment, $i^1$, is attached, intermeshing with the teeth of a pinion, or any suitably-arranged power, to lower or raise the lower roller by swinging it from the center of the roller $h^3$, as indicated by the line $x$, causing it to cut at a greater or lesser depth, as required; and also providing a means of altogether raising it from the bog for repairs, or when desired.

The buckets $h^1$ discharge their contents into a spout, $i^2$, situated as indicated in the drawing, and provided with a screw, $i^3$, extending its entire length, and rotated by the machinery to assist the discharge of the semi-fluid peat therefrom.

Between the power and the machinery a friction is interposed, so that in case the buckets $h^1$, coming in contact with any obstacle, the danger of damage to the machinery may be obviated.

In combination with the above curers and scow, the peat is further prepared in mills, $k$, of a similar character to those used in forming building-bricks; and in these the peat is still further compressed and formed into rectangular shapes of any desired dimensions, after which it is stored in any convenient shed for further drying and market.

Having now described the construction of my peat-manufacturing apparatus, I will now proceed to describe more particularly the *modus operandi* of making the peat-fuel, which is as follows:

In the commencement of operations, and after the platform and separators have been constructed, and situated as above described, and the first cut commenced, the peat cut from the bog and discharged by the screw $i^3$ falls directly into the curers $f^2$ as the excavator $h^1$ passes in front of each.

After the first cut has been made of the desired length, the excavator is brought back to the commencement, and entered on a second cut made parallel to and adjoining the first one. In this case, and when the excavator is not too far distant, the semi-fluid peat may be conveyed by any suitably-extended spout into the curers $f$.

After the work has become advanced the peat from the spout $i^2$ will be discharged into a vessel, $m$, elevated a suitable height upon a scow, $m'$, and having an inclined bottom. This is brought end on to a vessel, $n$, lying in the cut alongside of the curer, to be filled. The incline of the vessel $m$ is such that by opening the end its contents will slide out into the vessel $n$, on which an elevator, $n'$, is placed, raising it and delivering it into an inclined spout, $o$, down which it slides into the curers.

The curers formed as hereinbefore described, allow of the free separation or drainage of the water from the peat by the openings $d'$ and $e^3$. In their bottoms and sides the drainage of the water is further assisted by making the sides $f$ of considerable height, and filling the curers to the top. The upper portion has an hydraulic action, expressing the water from it.

The curers are thus filled with the excavated peat in succession, and when the first ones filled have been sufficiently drained of water contained in them, it will be found that the level of the peat will have fallen considerably, so much so as to make room for the dump-wagon $g^3$ traveling on the rails $g^2$.

The beams $e^1$, wale pieces $g^1$, and rails $g^2$, may, if desired, be extended at the land end on trestle-work, so that when the peat is dug out of the curers and placed in the wagon it may be run close up to the line of the mills $k$, and dump its contents close beside them, or at any intervening point. The peat is now placed in the mills $k$ and further pressed into the form before described.

Having now described the construction and operation of my invention, to which I have given the name of "Griffin's International Peat-Fuel Machinery,"

What I claim as my invention, and wish secured by Letters Patent, is the new and useful improvements on the art of manufacturing peat-fuel and on the apparatus used therefor, as follows:

1. The excavator $h$, in its parts of vessel $h^2$, rollers $h^3$ and $h^4$, chains $h^5$, hangers $h^6$, buckets $h^1$, segments $i$, spout $i^2$, screw $i^3$, all working together, substantially in the manner and for the purpose described.

2. The curers $f^1$, in their parts of timbers $c^1$ and $c^2$, scantling $d$ and $e$, with openings $d'$ and $e^3$, beams $e^1$, wale pieces $g^1$, rails $g^2$, planks $f$, all working together, substantially in the manner and for the purpose described.

3. The curves $f^1$, with openings or spaces $d'$ and $e^3$ in the scantling $d$ and $e$, working together and with other parts of the curers, substantially in the manner and for the purpose described.

Montreal, 25th day of November, A. D. 1870.

ROBERT ARTHUR GRIFFIN.

Witnesses:
CHARLES LEGGE,
CHARLES G. C. SIMPSON.